(12) United States Patent
Ryu et al.

(10) Patent No.: US 10,480,393 B2
(45) Date of Patent: Nov. 19, 2019

(54) HEATER FOR ELECTRONIC THERMOSTAT AND METHOD FOR MANUFACTURING ELECTRONIC THERMOSTAT

(71) Applicant: WOO JIN IND. CO., LTD., Ansan-si, Gyeonggi-do (KR)

(72) Inventors: Seok-Ha Ryu, Ansan-si (KR); Young Jin Cho, Ansan-si (KR); Seok-Ju Lee, Seoul (KR)

(73) Assignee: WOO JIN IND. CO., LTD., Ansan-si (KR)

( * ) Notice: Subject to any disclaimer, the term of this patent is extended or adjusted under 35 U.S.C. 154(b) by 416 days.

(21) Appl. No.: 15/076,620

(22) Filed: Mar. 21, 2016

(65) Prior Publication Data
US 2017/0016382 A1 Jan. 19, 2017

(30) Foreign Application Priority Data
Jul. 14, 2015 (KR) .................. 10-2015-0099835

(51) Int. Cl.
*G05D 23/19* (2006.01)
*F01P 7/16* (2006.01)
(Continued)

(52) U.S. Cl.
CPC .............. *F01P 7/167* (2013.01); *B23P 15/001* (2013.01); *G05D 23/1852* (2013.01);
(Continued)

(58) Field of Classification Search
CPC ......... G05D 23/1852; G05D 23/27537; G05D 23/30
(Continued)

(56) References Cited

U.S. PATENT DOCUMENTS

| 5,034,595 A * | 7/1991 | Grendys | .................. H05B 3/06 |
| | | | 219/541 |
| 2008/0290085 A1* | 11/2008 | Schlipf | .................... H05B 3/06 |
| | | | 219/526 |

(Continued)

FOREIGN PATENT DOCUMENTS

| JP | 2003-222072 A | 8/2003 |
| JP | 2005-155831 A | 6/2005 |

(Continued)

OTHER PUBLICATIONS

International Search Report in International Application No. PCT/KR2015/007357, dated Mar. 14, 2016.

*Primary Examiner* — Keith M Raymond
*Assistant Examiner* — Nael N Babaa
(74) *Attorney, Agent, or Firm* — Park, Kim & Suh, LLC (57) ABSTRACT

The present invention is aimed at providing an improved heater for electronic thermostats which can increase clamping force between a wax case and the heater while allowing reduction in the number of components and cost reduction, thereby improving productivity and reducing manufacturing costs in manufacture of an electronic thermostat, while improving durability and operational reliability of an electronic thermostat. The present invention provides a heater for electronic thermostats including: a hollow tube open at one end thereof and closed at the other end thereof; a heating member disposed inside the tube and generating heat by electrical resistance; and lead wires supplying electric power to the heating member, wherein the tube is directly inserted into a fastening hole of a wax case through interference fitting such that the heater is mounted on the wax case.

12 Claims, 8 Drawing Sheets

(51) Int. Cl.
*G05D 23/185* (2006.01)
*G05D 23/30* (2006.01)
*H05B 3/48* (2006.01)
*B23P 15/00* (2006.01)
*H05B 3/06* (2006.01)
*G05D 23/275* (2006.01)

(52) U.S. Cl.
CPC ......... *G05D 23/1921* (2013.01); *G05D 23/30* (2013.01); *H05B 3/06* (2013.01); *H05B 3/48* (2013.01); *F01P 2070/04* (2013.01); *G05D 23/27537* (2013.01)

(58) Field of Classification Search
USPC ..... 236/99 K, 68 B; 219/202, 542, 260, 265, 219/267, 270
See application file for complete search history.

(56) References Cited

U.S. PATENT DOCUMENTS

2013/0263799 A1* 10/2013 Lee .................. F01P 7/00
123/41.02
2015/0351157 A1* 12/2015 Cho .................. H05B 3/0014
219/541

FOREIGN PATENT DOCUMENTS

| KR | 10-2012-0010038 A | 2/2012 | |
|---|---|---|---|
| KR | 10-2013-0113824 A | 10/2013 | |
| KR | 10-2013-0114505 A | 10/2013 | |
| KR | 10-1497655 B1 | 2/2015 | |
| WO | WO-8501810 A1 * | 4/1985 | ......... G05D 23/1921 |

* cited by examiner

HEATER FOR ELECTRONIC THERMOSTAT AND METHOD FOR MANUFACTURING ELECTRONIC THERMOSTAT

CROSS-REFERENCE TO RELATED APPLICATIONS

This application claims priority to and the benefit of Korean Patent Application No. 10-2015-0099835 filed in the Korean Intellectual Property Office on Jul. 14, 2015, the entire contents of which are incorporated herein by reference.

BACKGROUND

Technical Field

The present invention relates to an electronic thermostat, and more particularly to a heater used in an electronic thermostat which opens/closes a valve at a predetermined temperature to circulate coolant to maintain an automotive engine at a constant temperature, and a method for manufacturing an electronic thermostat using the same.

Description of the Related Art

Generally, an automotive thermostat is disposed between an engine and a radiator and automatically switches on/off in response to temperature change of a coolant to regulate coolant flow to the radiator, thereby maintaining the coolant temperature within a preset range.

In a mechanical thermostat, wax expands depending upon temperature of a coolant to operate a piston to open a valve.

Such a mechanical thermostat is operable in response to a switching on/off temperature set to a specified temperature. That is, the mechanical thermostat allows a valve to be opened/closed only at a preset temperature and thus cannot actively cope with demand for high performance/high efficiency vehicles and changes in driving environment or conditions.

To supplement shortcomings of such a mechanical thermostat, an electronic thermostat based on a variable control system capable of artificially controlling expansion of wax has been developed and applied to vehicles in practice.

An electronic thermostat actively controls temperature of an engine coolant according to a driving environment such as a load condition of a vehicle to maintain the coolant at an optimal temperature, and is superior to mechanical thermostats in terms of improvement in fuel efficiency and reduction in exhaust emissions.

The electronic thermostat employs a cartridge heater to actively control coolant temperature. Here, such a heater is mounted on a wax case and serves as a heat source artificially supplying heat to wax within the wax case, thereby increasing valve opening/closing speed.

In other words, the electronic thermostat further includes the cartridge heater which generates heat upon application of electric power, causing wax to expand, in addition to basic components of a typical mechanical thermostat, wherein the heating value of the cartridge heater is adjusted according to a driving environment of a vehicle such as driving speed, temperature of intake air, and engine load, thereby variably controlling valve opening/closing timing.

Figure 1:
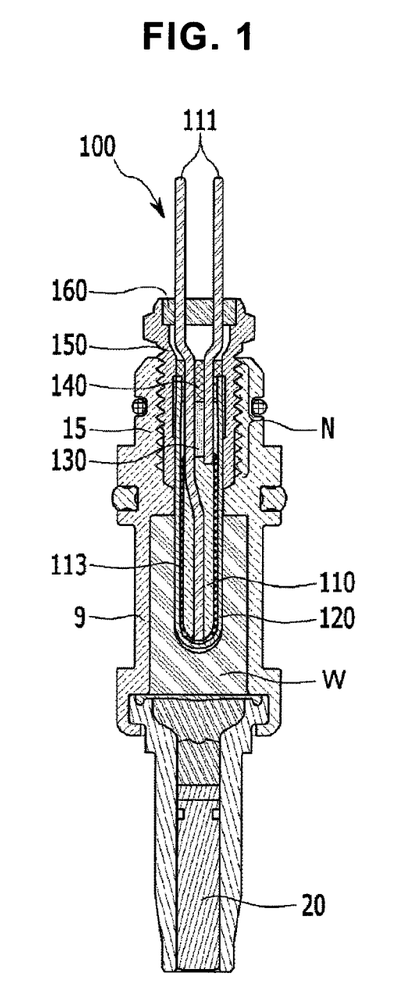
FIG. 1 is a sectional view of a typical heater for thermostats mounted on a wax assembly.
Figure 2:
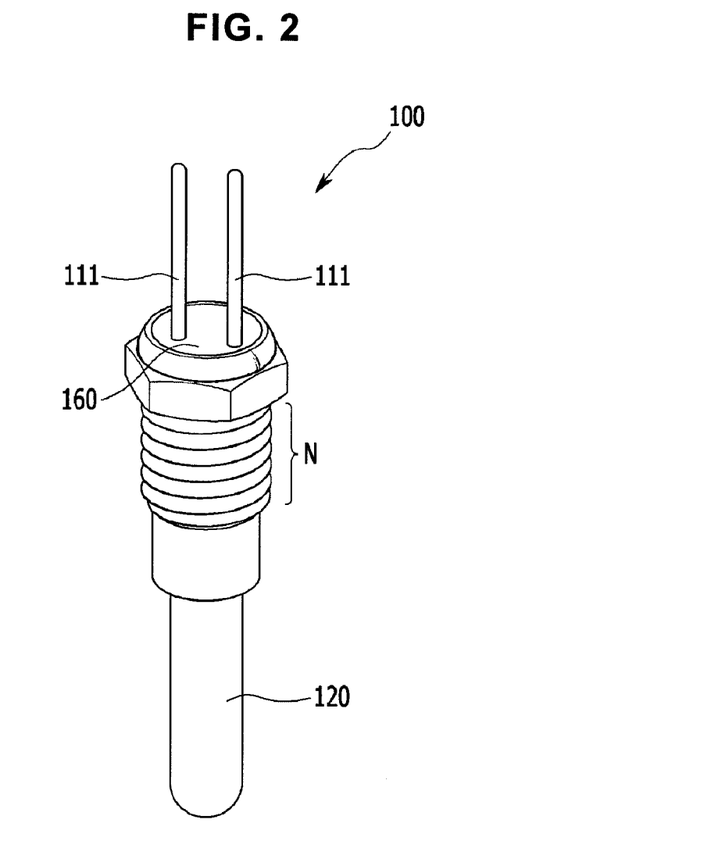
FIG. 2 is a perspective view of the heater for a thermostat of FIG. 1.

FIG. 1 is a sectional view of a typical heater for a thermostat mounted on a wax assembly and FIG. 2 is a perspective view of the heater for a thermostat of FIG. 1.

Referring to FIGS. 1 and 2, a typical cartridge heater for electronic thermostats 100 is inserted into wax W which expands and contracts in response to change in temperature within a wax case 9 contained in a thermostat to move a piston 20 back and forth, as shown in FIG. 1.

Here, the wax case 9 has a wax receiving space filled with the wax W and is formed at an upper portion thereof with a securing portion 15 on which the cartridge heater is mounted.

The cartridge heater 100 is mounted on the securing portion 15 of the wax case 9 by screw fastening using a fastener 150 and generates heat upon application of electric power, thereby selectively applying heat to the wax W.

Such a cartridge heater 100 includes a bobbin 110, a tube 120, insulation materials 130, an insulation cap 140, and the fastener 150.

First, lead wires 111 connected to an external power source are inserted into the bobbin 110 and a coil 113 connected to each of the lead wires 111 is wound around an outer circumferential surface of the bobbin 110.

Here, the lead wires 111 are connected to an external power source via a connector (not shown) such that the power source apply electric currents of different polarities to the lead wires, respectively, and the coil 113 is connected at one end thereof to one of the lead wire 111 and connected at the other end thereof to the other lead wire 111.

Accordingly, when supplied to the lead wires 111, electric current is delivered to the coil 113 via the lead wires 111 and flows through the coil 113, thereby allowing the coil 113 to generate heat.

The tube 120 is closed at one end thereof and open at the other end thereof. The bobbin 110 is mounted on the tube such that the other end of each of the lead wires 111 mounted on the bobbin 110 outwardly protrudes, with the bobbin 110 inserted into the tube through the open end of the tube towards the closed end of the tube.

The tube 120 is inserted into the wax W at the closed end thereof, increases temperature of the wax W using heat generated by the coil 113, and protects the coil 30 from chemical corrosion.

With the bobbin 110 inserted into the tube, the tube 120 is filled with the insulation materials 130. The insulation materials 130 are composed of magnesium oxide (MgO) powder.

Here, the magnesium oxide (MgO) powder maintains insulation between the tube 120 and the coil 113 to prevent current across the coil 113 from flowing into the tube 120 and prevents displacement of the coil while transferring heat generated by the coil 113 to the tube 120.

After the tube 120 is filled with the insulation materials 130 and the insulation cap 140 is mounted on the tube subsequent to insertion of the bobbin 110 having the lead wires 111 and the coil 113 mounted thereon into the tube 120, the tube 120 is shaped to have an outer diameter of a predetermined size and a curved surface at the closed end thereof by swaging.

The fastener 150 is mounted on the other end of the tube 120 to surround an outer circumferential surface of the other end of the tube 120 and is coupled to the wax case 9, thereby allowing the tube 120 to remain inserted into the wax 30.

Here, the tube 120 is press fitted into the fastener 150 with the closed end thereof protruding therefrom, whereby the tube 120 can be prevented from being separated from the fastener 150.

The fastener 150 is formed with threads N along an outer circumferential surface thereof and screwed to the securing portion 15 of the wax case 9 through the threads N.

In addition, a bush 160 securing the lead wires 111 protruding from the other end of the tube 120 may be mounted on the fastener 150.

However, such a typical heater for electronic thermostats, which uses the fastener 150 for coupling to the wax case and wax leakage prevention, has problems as follows.

A typical heater for thermostats structurally requires a fastener 150. This is because the fastener 150 functions as a coupling member through which the heater is coupled to a wax case and prevents wax leakage while serving as a negative terminal for grounding and is thus considered an indispensable component.

Accordingly, a process of manufacturing a thermostat requires manufacture and assembly of the fastener 150, and thus becomes complicated and requires many assembly operations, thereby causing deterioration in productivity while increasing manufacturing costs.

Specifically, manufacture of a thermostat using a typical heater for thermostats requires separate manufacture of a fastener to be coupled to a tube constituting the heater for thermostats, formation of a female thread on a wax case, and formation of a male thread corresponding to the female thread of the wax case on an outer surface of the fastener.

In addition, manufacture of a typical heater for thermostats must include inserting lead wires 111 into a bobbin 110, winding a coil 113 around the bobbin 110, and connecting the lead wires 111 to the coil 113, thereby providing a complex process.

Thus, use of the fastener for coupling the heater for thermostats to the wax case causes increase in the number of components and requires lots of complex manufacture and assembly processes, thereby causing deterioration in productivity while increasing manufacturing costs.

Further, when the typical thermostat is used for a long time, the thermostat often suffers from deterioration in clamping force due to loosening of a screw joint between the fastener and the wax case caused by vibration of a vehicle, thereby causing deterioration in wax leakage prevention.

Moreover, manufacture of the typical heater for thermostats requires lots of components and complex processes for manufacturing and assembling a heating unit, such as preparing a bobbin, inserting lead wires into the bobbin, winding a coil around the bobbin, and connecting the coil to the lead wires, which also causes deterioration in productivity and increase in manufacturing costs in manufacture of a thermostat.

Therefore, there has been continuous demand for an improved heater for thermostats that can increase productivity and reduce costs in manufacture of an electronic thermostat while enhancing durability and operational reliability when used in the thermostat.

Examples of the related art are disclosed in Korean Patent Publication No. 10-1497655 B and Korean Patent Publication No. 10-2013-0114505 A.

BRIEF SUMMARY

The present invention has been conceived to solve such problems in the related art and it is one object of the present invention to provide an improved heater for electronic thermostats which can increase clamping force between a wax case and the heater while allowing reduction in the number of components and cost reduction, thereby improving productivity and reducing manufacturing costs in manufacture of an electronic thermostat.

It is another object of the present invention to provide a heater for electronic thermostats which can improve durability and operational reliability of an electronic thermostat.

In accordance with one aspect of the invention, a heater for electronic thermostats includes: a hollow tube open at one end thereof and closed at the other end thereof; a heating member disposed inside the tube and generating heat by electrical resistance; and lead wires supplying electric power to the heating member, wherein the tube is directly inserted into a fastening hole of a wax case through interference fitting such that the heater is mounted on the wax case.

The heater for electronic thermostats according to embodiments of the invention provides the following effects.

First, unlike typical heaters, the heater for electronic thermostats according to the embodiments of the present invention does not require a fastener for the heater and is thus simplified in structure and processing process, thereby improving productivity for mass production and workability in manufacture and assembly while reducing manufacturing costs.

Namely, the heater for electronic thermostats according to the embodiments of the present invention can eliminate a need for a fastener for mounting the heater on a heater mounting portion by allowing screw fastening, and thus enables reduction in the number of components and assembly effort by eliminating a need for insulators, O-rings, and annular nuts, which would otherwise be necessary, thereby improving productivity while reducing manufacturing costs.

In particular, a typical electronic thermostat can suffer from deterioration in wax leakage prevention due to loosening of a screw joint between a fastener and a wax case and thus can exhibit poor operational reliability and control responsiveness. On the contrary, in the electronic thermostat according to the embodiments of the present invention, a tube is directly inserted into a wax case through interference fitting to improve clamping force between the heater and a wax assembly, and thus does not suffer from deterioration in wax leakage prevention, thereby improving operational reliability and control responsiveness.

Further, the heater for electronic thermostats according to the embodiments of the present invention secures sufficient insulation between components within a tube, thereby further achieving improvement in durability (lifespan) and reliability.

In addition, unlike a typical heater for thermostats, the heater for electronic thermostats according to the embodiments of the present invention has a structure in which first and second lead wires for supplying electric power and a tube are insulated from one another, and thus does not suffer from adhesion of foreign materials to a valve operating portion on outer walls of components thereof.

In other words, since a typical heater for thermostats has a structure in which a tube is electrically connected to a fastener, which in turn is grounded to a vehicle body, there is a concern that foreign matter adheres to a valve operating portion due to electrolysis of a coolant composed of an antifreeze and water caused by electrical conduction between the fastener and the wax case, thereby causing malfunction of the electronic thermostat. On the contrary, the heater for electronic thermostats according to the embodiments of the present invention has a structure in which the tube is insulated from a heating coil and thus can fundamentally prevent electrolysis of the coolant.

Thus, the heater for electronic thermostats according to the embodiments of the present invention can completely prevent adhesion of foreign matter to the valve operating portion due to electrolysis of the coolant, thereby improving durability (lifespan) and operational reliability of the electronic thermostat.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Hereinafter, embodiments of the present invention will be described in detail with reference to FIG. 3 to FIG. 9.

Referring to FIG. 3 to FIG. 9, a heater H for electronic thermostats according to one embodiment of the present invention includes: a hollow tube 1 open at one side thereof and closed at the other side thereof; a heating member disposed inside the tube 1 and generating heat by electric resistance; and lead wires 3a, 3b supplying electric power to the heating member, wherein the tube 1 is directly inserted into a fastening hole of a wax case 9 through interference fitting such that the heater is mounted on the wax case 9.

Figure 3:
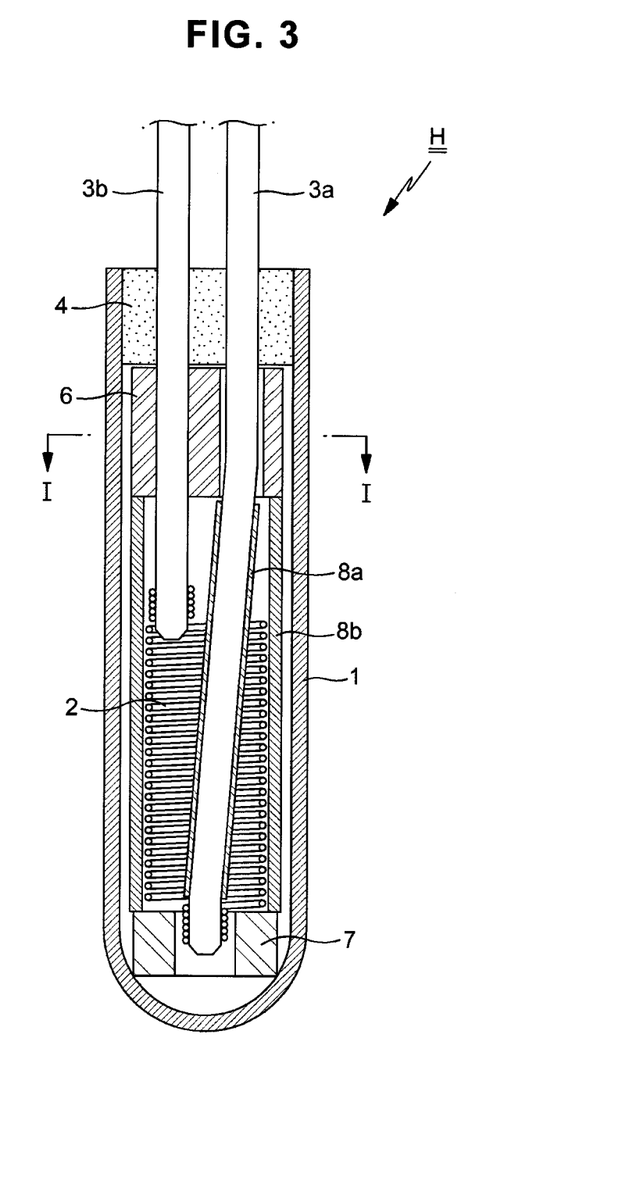
FIG. 3 is a longitudinal sectional view of a heater for electronic thermostats according to one embodiment of the present invention before swaging.
Figure 4:
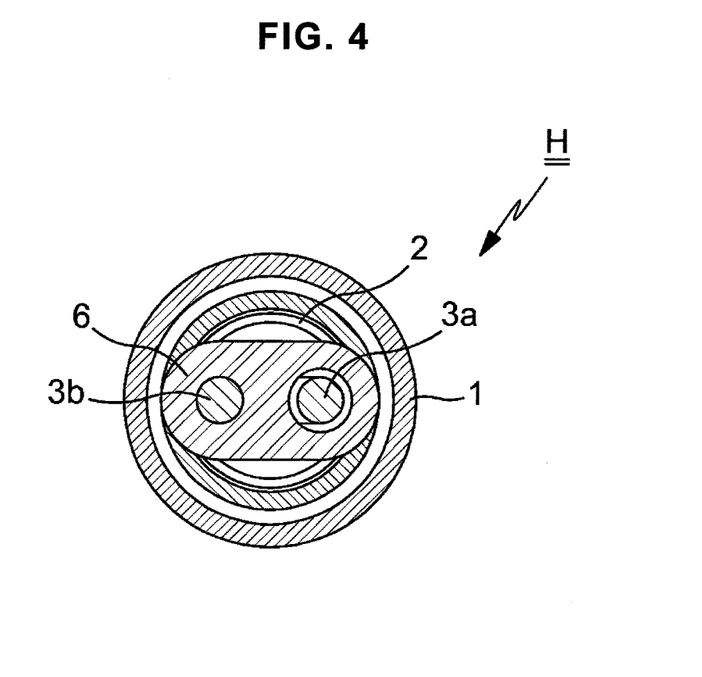
FIG. 4 is a cross-sectional view of the heater for electronic thermostats taken along line I-I of FIG. 3.

Here, the lead wires include a first lead wire 3a which is a positive terminal having one end exposed outside the tube 1 and the other end disposed inside the tube 1 to receive external electric power through the one end thereof exposed outside the tube 1, and a second lead wire 3b which is a negative terminal having one end exposed outside the tube 1 and the other end disposed inside the tube 1 to be separated from the first lead wire 3a.

Figure 6:
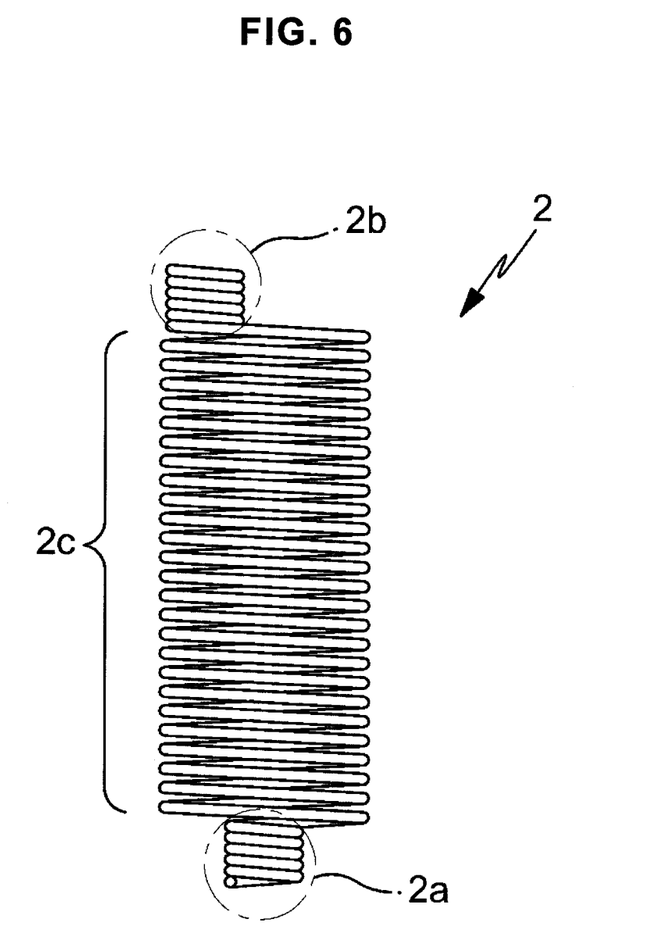
FIG. 6 is a front view of a heating member of the heater shown in FIG. 4.

The heating member is a heating coil 2 generally having a helically wound shape and is connected to one end of each of the first and second lead wires 3a, 3b.

Upper and lower ends of the heating coil 2 have reduced diameters corresponding to the diameters of the lead wires 3a, 3b, as compared with other portions of the heating coil 2, and are fitted into the corresponding ends of the first and second lead wires 3a, 3b. The upper and lower ends of the heating coil 2 are joined to the corresponding ends of the first and second lead wires 3a, 3b by resistance welding or laser welding, after the upper and lower ends of the heating coil 2 are fitted over the ends of the first and second lead wires 3a, 3b, respectively.

Since the lower end of the heating coil 2 is centrally located in the tube, the first lead wire 3a is bent at a middle portion thereof and provided at a portion thereof under the bent point with a first insulation pipe 8a for securing insulation from the second lead wire 3b and withstand voltage.

In other words, a portion of the first lead wire 3a above the bent point is spaced from the second lead wire 3b by a distance capable of ensuring sufficient insulation from the second lead wire, whereas the portion of the first lead wire under the bent point can approach the second lead wire 3b so as to be coupled to the lower end of the heating member centrally located at the tube 1. Thus, the first insulation pipe 8a is provided to the portion of the first lead wire 3a under the bent point to secure insulation between the lead wires and withstand voltage.

As described above, both ends of the heating coil 2 are fitted into the front ends of the first and second lead wires 3a, 3b before welding. Thus, both ends of the heating coil 2 may be decreased in diameter to enhance connection between the heating coil and the lead wires so as to be prevented from being separated from the front ends of the first and second lead wires before welding.

An insulation cap 4 made of an insulation material and sealing off an entrance of the tube 1 is disposed inside the entrance of the tube 1, and the tube 1 is filled with a powdery insulation material (not shown). Preferably, the powdery insulation material is MgO powder.

Beneath the insulation cap 4, there is provided an insulation spacer 6 which holds the first and second lead wires 3a, 3b in a separated state during assembly and allows insulation resistance of the first and second lead wires 3a, 3b to be maintained.

Figure 5:
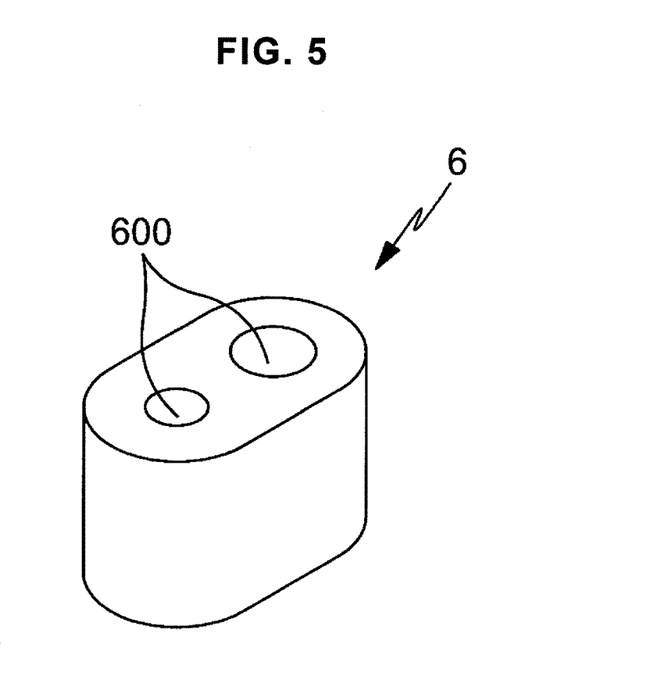
FIG. 5 is a perspective view of an insulation spacer of the heater shown in FIG. 4.

The insulation spacer 6 is a geometric structure, which is placed inside the tube 1 and has a section circumferentially isolated from a certain region of an inner circumferential surface of the tube to allow the tube 1 to be easily filled with the insulation material. The insulation spacer 6 has, for example, a rectangular, oval, or slotted shape in plan view (i.e. when viewed from above) and is formed therethrough with through-holes 600 through which the first and second lead wires 3a, 3b pass. The insulation spacer 6 is formed of the same material as the insulation powder, i.e. MgO.

Inside the tube 1, the first lead wire 3a is provided at the front end thereof with an insulation ring 7 to secure insulation between the front end of the first lead wire 3a and the tube 1.

Inside the tube 1, a second insulation pipe 8b is disposed under the insulation spacer 6 of the tube 1 to secure insulation between the tube 1 and the heating coil 2.

Preferably, the second insulation pipe 8b has a length capable of insulating a section ranging from a lower side of the insulation spacer 2 to an upper side of the insulation ring 7.

Next, a method for manufacturing an electronic thermostat including the heater H for electronic thermostats as set forth above will be described.

Figure 7:
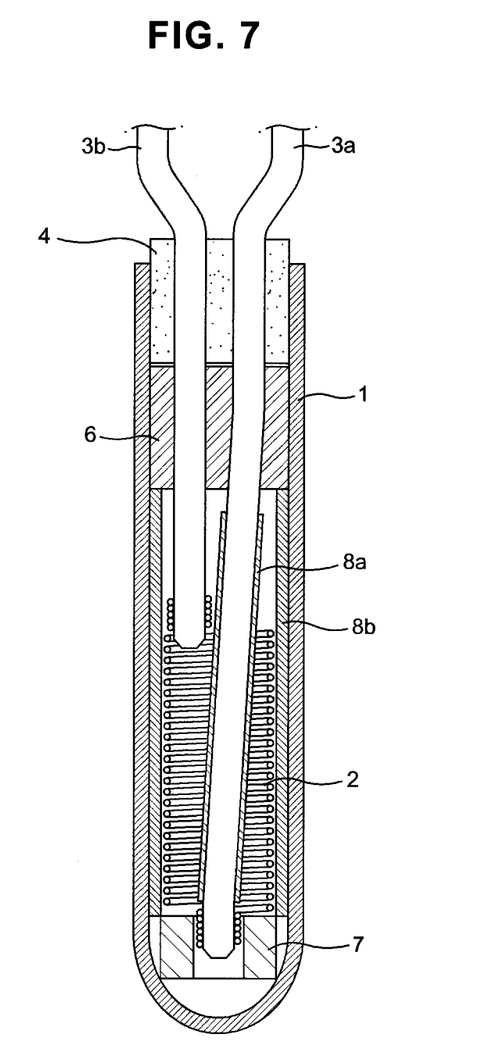
FIG. 7 is a longitudinal sectional view of the heater for electronic thermostats according to the embodiment of the present invention after swaging.
Figure 8:
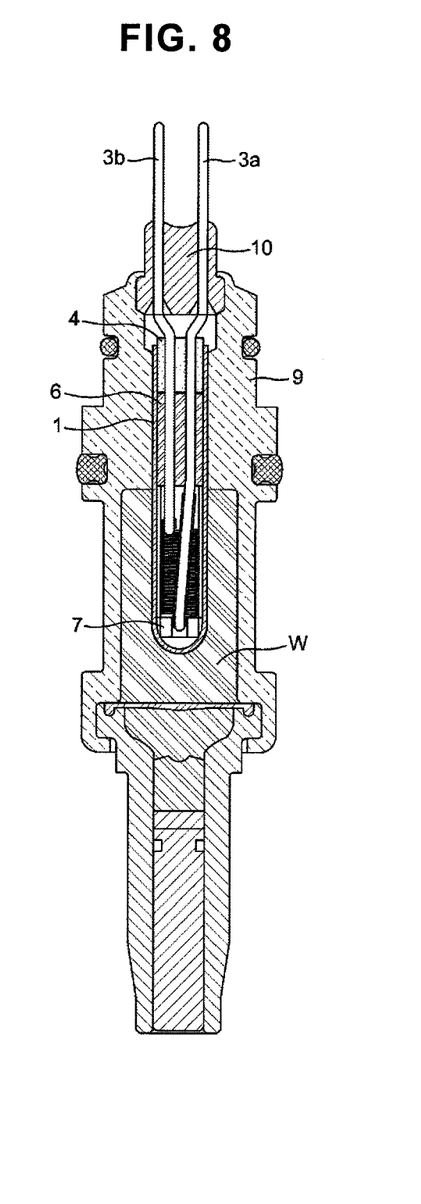
FIG. 8 is a sectional view of the heater for electronic thermostats according to the embodiment of the present invention, when mounted on a wax assembly.
Figure 9:
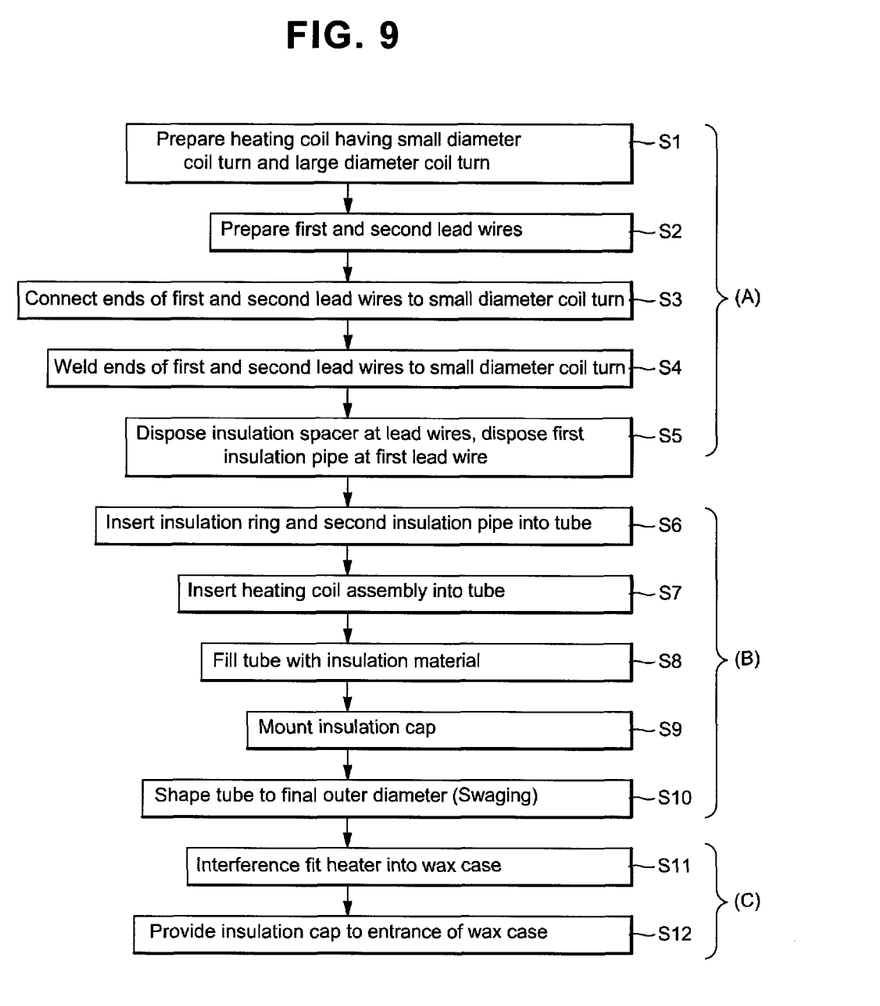
FIG. 9 is a flowchart showing a method for manufacturing an electronic thermostat including a heater for electronic thermostats according to one embodiment of the present invention.

The method for manufacturing an electronic thermostat will be described with reference to FIG. 3 to FIG. 8 together with FIG. 9, which is a flowchart showing the method for manufacturing an electronic thermostat including the heater H for electronic thermostats as set forth above.

Referring to FIG. 3 to FIG. 9, the method for manufacturing an electronic thermostat according to one embodiment of the present invention includes: (A) fabricating a heating coil assembly by joining a heating coil 2 to lead wires 3a, 3b, (B) mounting the heating coil assembly on a tube 1, filling the tube 1 with an insulation powder, and shaping the tube 1 to a final outer diameter, and (C) inserting the tube 1 shaped to the final outer diameter into a wax case 9 through interference fitting to mount a heater H on the wax case. Next, each operation will be described in detail.

First, in the operation (A) of fabricating the heating coil assembly, there is prepared a heating coil 2 having small diameter coil turns 2a, 2b for insertion and electrical connection of ends of lead wires 3a, 3b at upper and lower ends thereof and a large diameter coil turn 2c between the small diameter coil turns 2a, 2b (S1).

Here, the large diameter coil turn 2c has a helical shape which has a smaller diameter than an inner diameter of the tube 1 and is sufficiently large to surround the lead wires 3a, 3b with a space therebetween.

Then, the lead wires 3a, 3b to be electrically connected to the heating coil 2 are prepared (S2).

Then, one end of the first lead wire 3a is inserted into and connected to the small diameter coil turn 2a disposed at the lower end of the heating coil 2, and one end of the second lead wire 3b is inserted into and connected to the small diameter coil turn 2b disposed at the upper end of the heating coil 2 (S3).

Thereafter, the small diameter coil turn 2a at the lower end of the heating coil 2 and the small diameter coil turn 2b at the upper end of the heating coil 2 are welded to the ends of the first and second lead wires 3a, 3b, respectively (S4).

In addition, the operation (A) of fabricating the heating coil assembly includes disposing an insulation spacer 6 to hold the first and second lead wires 3a, 3b in a separated state (S5). Preferably, the insulation spacer 6 is disposed at a bent point of the first lead wire 3a.

This serves to prevent the insulation spacer 6 from being moved up towards an upper portion of the tube during ultrasonic filling, which is performed to uniformly fill the tube with an insulation powder, in introduction of a powdery insulation material into a space between the insulation spacer 6 and the tube 1.

Although the insulation spacer 6 may be disposed after connecting the lead wires 3a, 3b to the heating coil 2, the present invention is not limited thereto. Alternatively, the insulation spacer 6 may be disposed on the lead wires 3a, 3b before connecting the lead wires 3a, 3b to the heating coil 2.

After completing the operation (A), the operation (B) is performed.

Specifically, the operation (B) includes inserting an insulation ring 7 and first and second insulation pipes 8a, 8b (S6), inserting the heating coil assembly into the tube 1 (S7), filling the tube 1 with an insulation powder (S8), providing an insulation cap 4 to an entrance of the tube (S9), and shaping the tube 1 to a final outer diameter (S10), which are sequentially performed.

Here, the tube 1 is shaped to have a predetermined outer diameter by swaging.

Swaging is performed to reduce the diameter of the tube 1 while increasing the length of the tube. Here, the insulation spacer 6 may be crushed during swaging.

In other words, since the insulation spacer 6 has a different physical form than the insulation powder and is formed of the same material as the insulation powder, i.e. MgO, the insulation spacer may be crushed upon application of pressure during swaging, unlike in FIG. 7.

Before inserting the heating coil assembly into the tube 1, insertion of the insulation ring 7 and the first and second insulation pipes 8a, 8b into the tube 1 is performed to further improve insulation between the tube and the heating coil, between the tube and the lead wires, and between the lead wires.

Insertion of the lead wire into the first insulation pipe 8a may be performed before welding the lead wire to the heating coil 2.

After completing the operation (B), the tube 1 shaped to a final outer diameter is inserted into a wax case 9 through interference fitting (S11), and an insulation cap 10 is provided to an entrance of the wax case 9 (S12), thereby completing the operation (C) of mounting the heater H for thermostats according to the present invention on the wax case.

In step S12 of providing the insulation cap 10 to the entrance of the wax case 9, after insertion of the insulation cap, sidewalls of the entrance of the wax case are inwardly retracted to secure the insulation cap.

Functions and effects of the heater H for electronic thermostats according to the present invention and the electronic thermostat including the same are as follows.

Unlike typical heaters for electronic thermostats, the heater H for electronic thermostats according to the present invention is mounted on a wax case by directly coupling a tube 1 to the wax case 9 without using a fastener 150 (see FIGS. 1 and 2).

In other words, the heater H for electronic thermostats according to the present invention allows the tube 1 to be inserted into a fastening hole of the wax case 9 through interference fitting and thus can be firmly secured to the wax case 9.

It should be understood that a minimum allowable diameter of the tube 1 is greater than a maximum allowable diameter of the fastening hole of the wax case 9 so as to create interference.

Unlike typical heaters, the heater for electronic thermostats according to the present invention does not require a fastener for coupling the heater to the wax case and is thus simplified in structure and processing process, thereby reducing manufacturing costs while preventing wax leakage due to loosening of a joint of the fastener.

In other words, the heater H for electronic thermostats according to the present invention eliminates a need for a fastener for mounting the heater H on the wax case by screw fastening, and thus allows size reduction of the heater H. Further, elimination of the fastener also eliminates a need for an insulator, an O-ring, and an annular nut, which are required in use of the fastener, thereby allowing reduction in the number of components of the thermostat.

In addition, the heater H for electronic thermostats according to the present invention eliminates a need for conventional processes such as forming a female thread for coupling of the fastener 150 at a heater-securing portion of the wax case 9, press fitting the fastener into the tube 1, tightness testing, inserting an insulator into an upper end of the fastener, and retracting the fastener, thereby reducing assembly effort in manufacture of a thermostat.

As described above, in a typical electronic thermostat, the heater H is screw fastened to the wax case using the fastener. Thus, a typical electronic thermostat is likely to suffer from deterioration in clamping force due to loosening of a screw joint between the fastener and the wax case 9 and thus has poor wax leakage prevention performance, thereby eventually exhibiting poor operational reliability and control responsiveness.

On the contrary, the electronic thermostat according to the present invention allows the heater H to be inserted into the wax case 9 through interference fitting and thus does not suffer from deterioration in clamping force and wax leakage prevention, thereby exhibiting enhanced operational reliability and control responsiveness while improving fuel efficiency of a vehicle.

Further, unlike typical heaters for thermostats, the heater H for electronic thermostats according to the present invention has a structure in which the first and second lead wires 3a, 3b for supplying electric power are insulated from the tube 1, and thus does not suffer from adhesion of foreign matter to a valve operating portion at an outer wall of components thereof.

In other words, a typical heater for thermostats has a structure in which a heating coil 2 is electrically connected to a tube 1, and the tube 1 is electrically connected to a fastener, which is, in turn, grounded to a vehicle body, there is a concern that foreign matter adheres to the valve operating portion due to electrolysis of a coolant composed of an antifreeze and water caused by electrical conduction between the fastener and a wax case 9, thereby causing malfunction of the electronic thermostat. However, the heater H for electronic thermostats according to the present invention has a structure in which the tube 1 is insulated from the heating coil 2 by the second insulation pipe 8b and thus can fundamentally prevent electrolysis of the coolant.

Thus, the heater H for an electronic thermostat according to the present invention can completely prevent adhesion of foreign matter to the valve operating portion due to electrolysis of coolant, thereby improving durability (lifespan) and operational reliability of a thermostat.

Further, in the heater H for electronic thermostats according to the present invention, since both ends of the heating coil 2 are adapted to receive respective ends of the lead wires 3a, 3b, both ends of the heating coil 2 can be easily connected and joined to the first and second lead wires 3a, 3b. Thus, the heater H for electronic thermostats is simplified in structure and processing process, thereby improving productivity for mass production and workability in manufacture and assembly while reducing manufacturing costs.

Although some embodiments have been described herein, it should be understood by those skilled in the art that these embodiments are given by way of illustration only, and that various modifications, variations and alterations can be made without departing from the spirit and scope of the invention. Therefore, the scope of the present invention should be defined by the appended claims and equivalents thereof.

What is claimed is:

1. A heater for electronic thermostats, comprising:
   a hollow tube open at one end thereof and closed at the other end thereof;
   a heating coil disposed inside the tube and generating heat by electrical resistance;
   lead wires supplying electric power to the heating coil, the lead wires including first and second lead wires being disposed in the tube and spaced apart from each other;
   an insulation cap disposed inside an entrance of the tube, the insulation cap being made of an insulation material and sealing off the entrance of the tube; and
   an insulation spacer disposed between the insulation cap and the heating coil within the tube and holding the first and second lead wires in a separated state, the insulation spacer having an outer surface spaced apart from an inner surface of the tube to allow the tube to be filled with the insulation material,
   wherein the tube is directly inserted into a fastening hole of a wax case through interference fitting such that the heater is mounted on the wax case,
   wherein the first lead wire is a positive terminal having a first end exposed outside the tube and a second end disposed inside the tube to receive external electric power through the one end thereof exposed outside the tube, and the second lead wire is a negative terminal having a first end exposed outside the tube and a second end disposed inside the tube to be separated from the first lead wire, and
   wherein the heating coil includes:
   a main coil having a predetermined diameter;
   a first coil connected to an lower end of the main coil and having a diameter smaller than the diameter of the main coil; and
   a second coil connected to upper end of the main coil and having a diameter smaller than the diameter of the main coil, wherein the second end of the first lead wire is inserted into the first coil disposed at the lower end of the main coil, and the second end of the second lead wire is inserted into the second coil disposed at the upper end of the main coil.

2. The heater for electronic thermostats according to claim 1, wherein the heating coil is connected to the second ends of the first and second lead wires.

3. The heater for electronic thermostats according to claim 1, wherein the tube is filled with a powdery insulation material.

4. The heater for electronic thermostats according to claim 1, wherein the insulation spacer has a rectangular, oval, or slotted shape.

5. The heater for electronic thermostats according to claim 1, further comprising:
   an insulation ring disposed below the heating coil within the tube, the insulation ring securing insulation between the second end of the first lead wire and the tube.

6. The heater for electronic thermostats according to claim 1, further comprising:
   a first insulation pipe enclosing a portion of the first lead wire under a bent point thereof and extending into the heating coil, the first insulation pipe securing insulation between the first and second lead wires and withstand voltage; and
   a second insulation pipe disposed below the insulation spacer within the tube and enclosing the heating coil to secure insulation between the heating coil and the tube.

7. The heater for electronic thermostats according to claim 6, wherein the second insulation pipe extends from a lower end of the insulation spacer to a lower portion of the heating coil.

8. The heater for electronic thermostats according to claim 1, wherein the first lead wire includes:
   a bent point formed at a body thereof; and
   a tilted portion extending from the bent point and tilted toward the second lead wire to be close to the second lead wire, the tilted portion being enclosed by the heating coil within the tube.

9. The heater for electronic thermostats according to claim 8, wherein the bent point of the first lead wire is accommodated by the insulation spacer within the tube.

10. The heater for electronic thermostats according to claim 1, wherein the first coil of the heating coil is arranged along a center axis of the tube, and the second coil of the heating coil is placed away from the center axis of the tube.

11. The heater for electronic thermostats according to claim 5, wherein the insulation ring encloses the first coil of the heating coil and the second end of the first lead wire.

12. The heater for electronic thermostats according to claim 6, wherein the second insulation pipe encloses the first and second lead wires.

* * * * *